United States Patent [19]
Ghaem

[11] Patent Number: 5,229,946
[45] Date of Patent: Jul. 20, 1993

[54] METHOD FOR OPTIMIZING ENGINE PERFORMANCE FOR DIFFERENT BLENDS OF FUEL

[75] Inventor: Sanjar Ghaem, Palatine, Ill.

[73] Assignee: Motorola, Inc., Schaumburg, Ill.

[21] Appl. No.: 746,543

[22] Filed: Aug. 19, 1991

[51] Int. Cl.$^5$ .................. G06F 15/20; F02D 41/02
[52] U.S. Cl. ...................... 364/431.05; 123/494; 395/900
[58] Field of Search ............ 364/431.05, 431.02, 364/431.06; 123/1 A, 494, 480; 395/900, 903, 905, 911, 913

[56] References Cited

U.S. PATENT DOCUMENTS

| | | | |
|---|---|---|---|
| 4,809,175 | 2/1989 | Hosaka et al. | 364/424 |
| 4,864,998 | 4/1989 | Onishi | 364/431.05 |
| 4,905,155 | 2/1990 | Kanno | 364/431.05 |
| 4,930,084 | 5/1990 | Hosaka et al. | 364/426.04 |
| 4,995,367 | 2/1991 | Yamauchi et al. | 123/494 |
| 5,038,730 | 8/1991 | Kashima | 123/179 H |
| 5,065,728 | 11/1991 | Nakaniwa | 395/900 |

OTHER PUBLICATIONS

"Fuzzy Logic Works with Degrees of Truth", by Brubaker, *Computer Design*, Mar. 1, 1991.
*Automotive Electronics Review*, Sep. 1990.
*Automotive Electronic News*, Monday, Jul. 31, 1989.

Primary Examiner—Thomas G. Black
Assistant Examiner—Tan Q. Nguyen
Attorney, Agent, or Firm—John H. Moore; Phillip H. Melamed

[57] ABSTRACT

Engine performance is optimized by storing a plurality of engine strategy maps (A, B, etc.), each such map containing desired engine performance characteristics, and selecting one such map by using fuzzy logic techniques to evaluate selected engine sensor output signals. Preferably, a new engine strategy map is not selected unless (1) additional fuel has been added to the vehicle's fuel tank; and (2) selected sensor output signals have experienced at least a minimum deviation from their nominal values, thus indicating that a different blend of fuel is being supplied to the engine.

5 Claims, 5 Drawing Sheets

| FUEL | CYLINDER PRESSURE | IGNITION TIMING | EMISSION LEVEL |
|---|---|---|---|
| 0% ALCOHOL | P0 | I0 | E0 |
| 10% | P10 | I10 | E10 |
| 20% | P20 | I20 | E20 |
| 30% | P30 | I30 | E30 |
| 40% | P40 | I40 | E40 |
| 50% | P50 | I50 | E50 |
| 60% | P60 | I60 | E60 |
| 70% | P70 | I70 | E70 |
| 80% | P80 | I80 | E80 |

*FIG. 2*

| FUEL | CYLINDER PRESSURE | IGNITION TIMING | EMISSION LEVEL |
|---|---|---|---|
| 0% ALCOHOL | P'0 | I'0 | E'0 |
| 10% | P'10 | I'10 | E'10 |
| 20% | P'20 | I'20 | E'20 |
| 30% | P'30 | I'30 | E'30 |
| 40% | P'40 | I'40 | E'40 |
| 50% | P'50 | I'50 | E'50 |
| 60% | P'60 | I'60 | E'60 |
| 70% | P'70 | I'70 | E'70 |
| 80% | P'80 | I'80 | E'80 |

*FIG. 3*

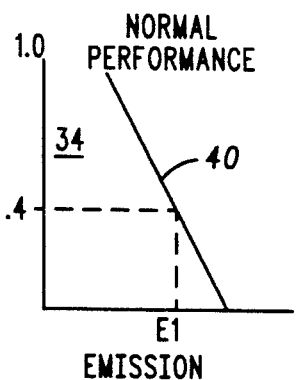 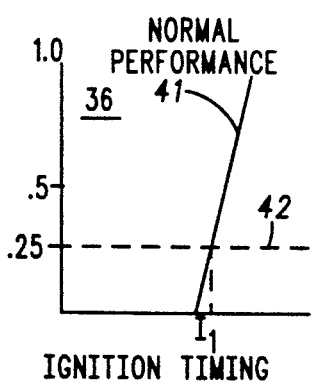 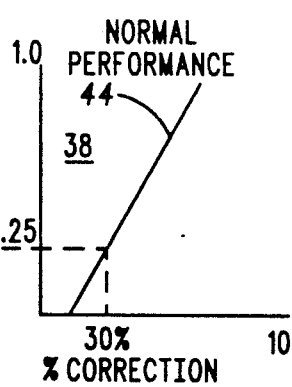
FIG.6-1   FIG.6-2   FIG.6-3  } RULE 1
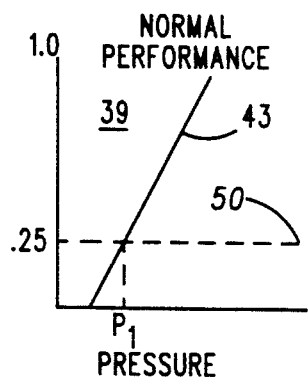 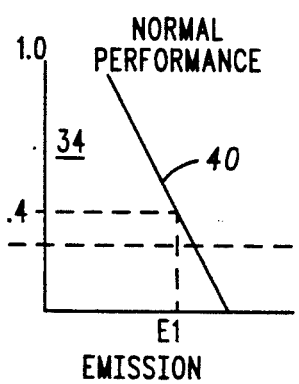 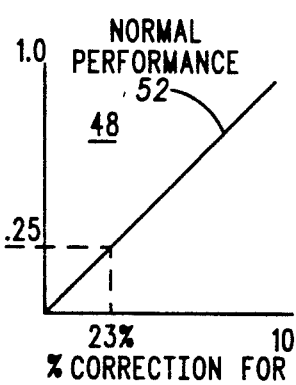
FIG.7-1   FIG.7-2   FIG.7-3  } RULE 2
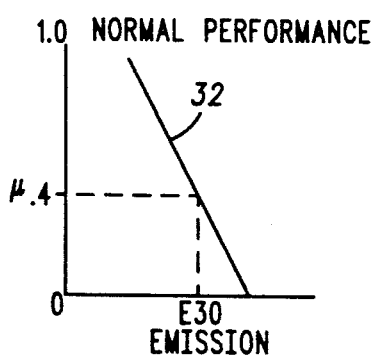
FIG.4
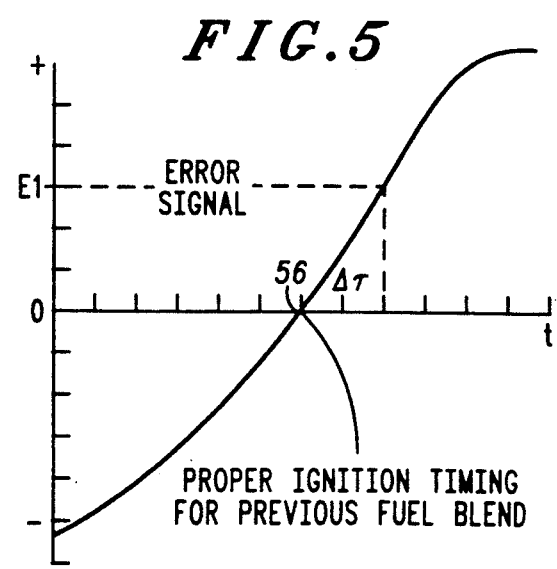
FIG.5

ENGINE STRATEGY MAP MATRIX

METHOD FOR OPTIMIZING ENGINE PERFORMANCE FOR DIFFERENT BLENDS OF FUEL

FIELD OF THE INVENTION

This invention is directed to the general field of automotive engine control, and more specifically to techniques for automatically optimizing the performance of such engines when the engine is supplied with different types or blends of fuel.

BACKGROUND OF THE INVENTION

For environmental reasons, it has become increasingly desirable for automotive engines to use blends of fuel which are less polluting. For example, some blends of fuels now include alcohol, and many automotive engines are able to run acceptably well on fuel that contains a certain percentage of alcohol.

Engine performance can be optimized when the percentage of alcohol in the fuel is known, but this is usually not the case. Hence, engine strategies have usually been selected to accommodate fuels with no alcohol or only a limited percentage of alcohol. To adapt an engine to a greater range of alcohol percentages, it has been necessary to know the fuel's actual percentage of alcohol. This means knowing not only the percentage of alcohol being pumped into the vehicle's fuel tank, but the actual percentage of alcohol in the fuel being fed to the engine. For example, if a fuel tank is half full of fuel containing no alcohol, and an operator fills the tank with fuel containing 50% alcohol, the engine will soon be receiving fuel whose alcohol content is roughly 25%. To measure this fuel composition, various types of chemical fuel sensors have been proposed, but they tend to be undesirably expensive.

Even having a good chemical fuel sensor does not resolve all the problems. To calculate the proper engine strategy (e.g. air-to-fuel ration, ignition timing, etc.) to accommodate a particular blend of fuel requires an on-board processor that uses a complicated mathematical model and lengthy calculations. Moreover, these calculations typically require accurate inputs from engine sensors, thus necessitating the use of fairly expensive sensors. Even with such sensors, the lengthy calculations tend to slow the processor's throughput, all of which leads to the conclusion that conventional techniques for dealing with different blends of fuels are inadequate.

BRIEF DESCRIPTION OF THE FIGURES

FIG. 2 is a table showing measured engine parameters versus percent of alcohol in the engine fuel;

FIG. 3 is a table showing optimized engine parameters versus percent of alcohol in the engine fuel;

FIG. 4 shows an exemplary performance characteristic set for measured engine emissions;

FIG. 5 illustrates the generation of an ignition timing error signal after engine start-up;

FIGS. 6-1, 6-2, and 6-3 and 7-1, 7-2 and 7-3 show exemplary performance characteristics sets, and the way such sets are used in a "fuzzy logic" scheme to correct engine performance following a change in the engine's fuel blend;

DESCRIPTION OF THE PREFERRED EMBODIMENT

Overview

Figure 1:
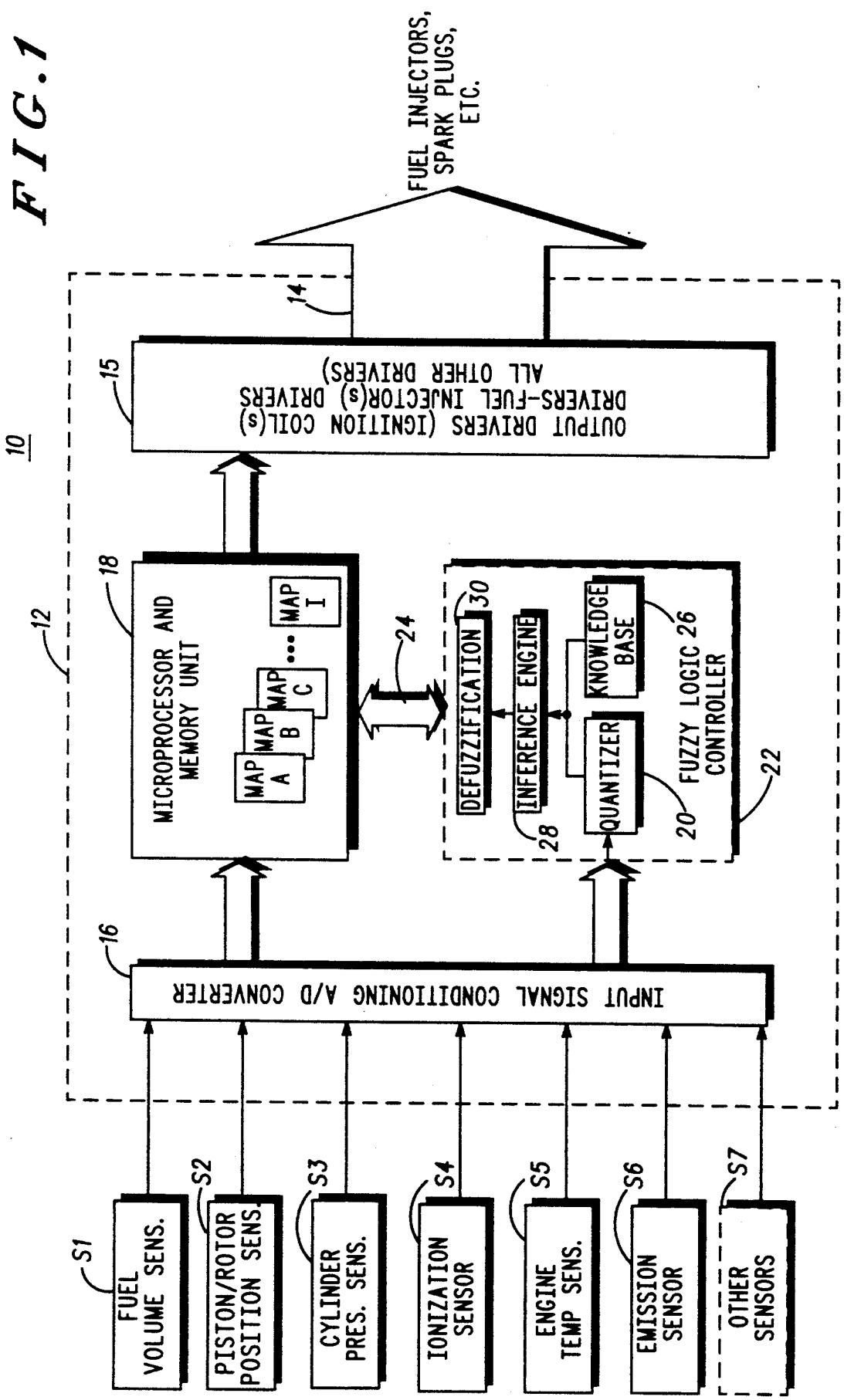
FIG. 1 is a block diagram of an exemplary automotive control system that operates in accordance with the invention.

A block diagram of an automotive system 10 which uses the invention is shown in FIG. 1. The main component of this system is a controller 12 which generates output signals at output port 14 for driving fuel injectors, spark plugs, etc. via a group of conventional output drivers identified by the block 15. These output signals are developed so as to optimize engine performance for the particular fuel blend being used by the engine.

To develop the correct output signals, a number of sensors S1–S7 sense various engine operating parameters and supply their output signals to a part of the controller 12 that is designated as an input signal conditioning A/D (analog-to-digital) converter 16. The sensor signals that are converted to digital form are fed to a microprocessor and memory unit 18, and also to a quantizer 20 that forms part of a fuzzy logic controller 22.

The microprocessor and memory unit 18 uses the sensor signals supplied by the converter 16 to monitor and control engine performance. Such performance will be in accordance with an engine strategy that is defined in one of the engine strategy maps A, B, C, etc. that are stored in the memory of the unit 18. For example, the map A may indicate the proper air-to-fuel ratio, ignition timing, etc. for the engine for a blend of fuel that includes 0% alcohol. Maps B and C will include similar information for blends of fuel that include 10% and 20% alcohol, respectively. Preferably, the unit 18 will include such a map for the blend of fuel that the engine is expected to use.

Using conventional fuzzy logic techniques (see, for example, an article entitled "Fuzzy Logic Works with Degrees of Truth" by Brubaker in the Mar. 1, 1991 issue of *Computer Design*), the fuzzy logic controller 22 uses the information contained in the sensor signals to make inferences as to whether the sensor signals correspond to normal engine operation. If abnormal operation is inferred, the controller 22 generates a signal at its output port 24 for selecting the operating system map stored in the unit 18 that provides the correct engine strategy for the blend of fuel that the engine is using.

Preferably, the fuzzy logic controller selects a new operating system map only under two conditions: (1) after fuel has been added to the fuel tank, and (2) after an evaluation of the sensor signals indicates that the values of at least selected sensor signals have experienced at least a minimum deviation from nominal values. If either of these two conditions are not present, it is assumed that either no fuel was added to the fuel tank, or that any added fuel has the same constituency as the fuel which the engine was most recently using. In the latter case, the engine continues running using the engine strategy map that was most recently selected.

On the other hand, if both conditions are met, the controller 22 assumes that fuel of a different constituency has been added to the fuel tank, it uses the sensor signals received from converter 16 to generate inferences as to the blend of fuel that the engine will now be using, and it signals the unit 18 via port 24 to choose the proper engine strategy map so as to move the values of the sensor signals toward desired values. Attainment of the desired values indicates that the proper engine strategy map has been selected.

An advantage of this technique is that it provides a fast, relatively low cost method of optimizing operation of the engine with various blends of fuel. Its speed is due to the fact that a quick calculation can determine whether any fuel was added. If no new fuel was added, the engine operates with the previously selected map. There is no need to go through the relatively slow process of re-evaluating the sensor signals and select a new map. Additionally, the fuzzy logic controller 22 uses heuristic rules for control, not needing a mathematical model of the control process nor lengthy calculations. This results in very fast-throughput. The low cost aspect of this technique results in part from the fact that the fuzzy logic controller does not require inputs (knowledge) to be expressed precisely. This allows a relaxation in the needed accuracy of the measurement process, thereby permitting the use of lower cost sensors.

Discussion of Specifics

In order to determine which engine strategy to use, based on inputs from the sensors S1, S2, etc., the fuzzy logic controller 22 includes a knowledge base 26. This knowledge base includes a memory (ROM, for example) which stores information generally defining what is considered normal engine operation. An inference engine 28 looks at the quantized sensor signals from quantizer 20 and the information stored in the knowledge base 26, and, in a broad sense, determines the extent to which the quantized sensor signals correspond to normal engine operation. The results obtained by the inference engine 28 are supplied to a defuzzification unit 30 that generates specific numeric information that selects one of the engine strategy maps A, B, C, etc.

Referring back to the knowledge base 26, the information contained therein is based on empirical data generated by the vehicle manufacturer, plus the experience and judgement of the same manufacturer. For example, the table shown in FIG. 2 shows measured data (from engine sensors) that results from changing the fuel blend from 0% alcohol to 80% alcohol. For a fuel blend of 0% alcohol, the cylinder pressure has a value P0, ignition timing has a value I0, and emission levels are at a value of E0. When the fuel blend was changed to 10% alcohol, the measured cylinder pressure changed to P10, the ignition timing changed to I10, and the emission level changed to E10. Corresponding data is included for each of the illustrated fuel blends. Typically, the outputs of more sensors may be included in such a table, such as the outputs from temperature sensors. The table of FIG. 2 is meant only to illustrate the type of information that is compiled.

Referring now to FIG. 3, this table shows the same fuel blends, 0% alcohol to 80% alcohol, but the data reflecting cylinder pressure, ignition timing, and emission level corresponds to desired values, as opposed to merely measured values. Thus, a fuel blend of 20% alcohol preferably results in a cylinder pressure of P'20, an ignition timing of I'20, and an emission level of E'20. These desired values are obtained by the vehicle manufacturer adjusting the engine for optimum performance for each fuel blend, and recording the data shown in FIG. 3.

It should now be stated that the tables shown in FIGS. 2 and 3 need not be included per se in the knowledge base 26. Rather, the information in these tables is used to derive a plurality of "performance characteristic sets" that are stored in the knowledge base 26.

To describe what a "performance characteristic set" is, we will use emission as an example. We can state that the function which relates emission to "normal performance" is a curve relating emission to a degree of membership in the fuzzy set "normal performance". Degree of membership is typically designated $\mu$, and the degree of membership of the fuzzy set "normal performance" as a function of emission can be shown by the exemplary performance characteristic set shown in FIG. 4.

As is conventional in fuzzy logic 13 systems, $\mu$ is shown as ranging from 0 to 1, where zero indicates no membership in the set and 1 indicates full membership. The diagonal line 32 (it could be a curve rather than a straight line) represents how various emission levels correspond to what is regarded as "normal performance". In the illustrated example, a measured emission level designated as E30 intersects the line 32 at a point that corresponds to a $\mu$ value of 0.4. This means that the emission level E30 has about a 40% chance of being regarded as "normal performance". Stated differently, the emission level E30 is a member of the set "normal performance" with degree of membership equal to 0.4.

The foregoing example illustrates how there need not be an absolute "yes" or "no" answer to the question as to whether a particular emission level constitutes "normal performance". There is a large grey that exists between the $\mu$ values of 0 and 1. Nevertheless, this "grey" area can be dealt with using fuzzy logic techniques to arrive at specific instructions for selecting an engine strategy map that matches the blend of fuel being used.

The set shown in FIG. 4, and others like it, are derived from tables such as those shown in FIGS. 2 and 3, and are additionally based on the experience and judgement of the vehicle manufacturer. Having derived such sets, the information they contain (and not the tables shown in FIGS. 2 and 3) is preferably stored in the knowledge base 26.

Referring again to FIG. 1, the knowledge base 26 stores information indicative of a performance characteristic set for each of a plurality of selected sensor signals. These performance sets are discussed below. The inference engine 28 (which includes a microprocessor that it shares with the defuzzification unit 30) applies a plurality of rules which calculate the effect which results from the various measured parameters (emission, cylinder pressure, etc.) having different degrees of membership in their respective performance characteristic sets. The operation of the inference engine using the knowledge base and the outputs of the quantizer 20 will now be described with reference to FIGS. 6 and 7 and to the following exemplary rules that are also stored in the inference engine 28:

Rule 1: If emission level is high AND ignition timing is low, THEN advance ignition timing.

Rule 2: If cylinder pressure is low AND emission level is normal, THEN add fuel (increase fuel-to-air ratio).

Rule 3: If cylinder pressure is low AND emission is normal, THEN advance spark timing.

Referring first to FIG. 6, two performance characteristic sets 34 and 36 are illustrated along with another diagram 38 that collectively apply Rule 1. Considering the set 34 first, it includes a line 40 that describes the relationship between measured emission and normal performance. We will assume that an emission level $E_1$ was measured. Extending $E_1$ vertically intersects the line 40 at a level $\mu$ equal to 0.4. This means that the measured emission level $E_1$ exhibits a 0.4 degree of membership in the set characterized as normal performance. In layman's terms this means that the emission level $E_1$ has a less than even chance of being characterized as normal.

Moving now to the set 36, it includes a line 41 that describes the relationship between measured ignition timing and normal performance. We will assume that an ignition timing equal to $I_1$ was measured. As shown, this corresponds to a $\mu$ level of 0.25, meaning that the measured ignition timing I1 exhibits a 0.25 degree of membership in the set characterized as normal performance.

Now Rule 1 will be applied by logically combining the membership values ($\mu$ values) with the aid of the diagram 38. Diagram 38 is a graphic representation of the application of the logical AND operator which operates as follows: A AND B=Min. ($\mu a$, $\mu b$). That is, the logical combination of A AND B results in selecting the minimum of the $\mu$ values $\mu a$ and $\mu b$.

Applying this to FIG. 6, we see that the $\mu$ level of 0.25 from set 36 is clearly smaller than the $\mu$ level 0.4 obtained from set 34; hence, only the smaller of the two need be considered in the application of Rule 1 which uses the logical AND operator. We extend the $\mu$ value 0.25 found in set 36 to the right as shown by the dashed line 42 until it passes though the vertical axis of diagram 38 at the 0.25 level and then intersects a line 44. The line 44 describes the relationship between the amount of correction (timing advance) to be applied per Rule 1 versus $\mu$ values.

As shown, the horizontal axis of diagram 38 represents a percentage of correction to be applied to the ignition timing advance. The intersection of the line 42 with the line 44 in diagram 38 corresponds to a point on the horizontal axis representing a 30% correction factor. What this means in layman's terms is that there is a 30% probability that the timing needs to be advanced, based on the results of evaluating measured ignition timing and emission level. But before any such action is taken, the remaining rules will be applied to reach a final conclusion.

Turning now to FIG. 7, sets 39, 34 and a diagram 48 are used to apply Rule 2. As shown, the set 39 includes a line 43 that describes the relationship between measured cylinder pressure and normal performance. We will assume that a cylinder pressure $P_1$ was measured. Extending $P_1$ vertically intersects the line 43 at a level $\mu$ equal to 0.25. This means that the measured pressure $P_1$ exhibits a 0.25 degree of membership in the set characterized as normal performance.

The set 34 that was used in the application of Rule 1 is reproduced in FIG. 7 because it is also used in the application of Rule 2. The measured emission is still $E_1$ (as previously measured and used in Rule 1), and this corresponds to a $\mu$ level of 0.4.

Referring now to the diagram 48, its horizontal axis represents percent correction to be applied to the fuel-to-air ratio. A line 52 describes the relationship between percent correction to be used on the determined $\mu$ values.

Because Rule 2 also uses the AND operator (requiring the selection of the minimum $\mu$ value used in the rule), the smaller $\mu$ value or 0.25 from set 39 is used in diagram 48 by extending a line 50 from the 0.25$\mu$ level in set 39 to and past the corresponding $\mu$ level in diagram 48 until it intersects the correction line 52. As shown, this $\mu$ level corresponds to a correction factor of 23% for fuel addition. In other words, the probability that fuel needs to be added is 23%, based on the previous evaluations of pressure and emission.

In practice, Rule 3 and any additional rules would be applied as Rules 1 and 2 have been. For brevity, the application of Rule 3 will be omitted, and it will be shown how one may combine the results of applying Rules 1 and 2 into a single, executable action. This step is accomplished by the defuzzification unit 30 (FIG. 1).

There are several techniques for combining the results from Rules 1 and 2. The first technique used herein uses a weighted average, where the weighting factor reflects the respective degree of membership values ($\mu$'s). This approach is used as follows:

$$\text{map selection number } N1 = \left[ \frac{.25 \times (30\%) + .25 \times (23\%)}{.25 + .25} \right]$$

In the above equation, the numerator consists of the $\mu$ value for ignition timing advance (0.25) times the correction factor (30%) for Rule 1, plus the $\mu$ value for pressure (0.25) times the correction factor (23%) for Rule 2. The denominator consists of the sum of the $\mu$ values for all rules used. The same weighted average technique is used with 3 or more rules.

The numeric result of the above equation, N1, may be supplied by the defuzzification unit 30 (FIG. 1) to the unit 18 via port 24. The unit 18 uses the number N1 to select one of the maps A, B, C, etc. as the new engine strategy. This may be accomplished by programming the unit 18 to associate with each number N1, or with a range of such numbers, a particular engine strategy map.

After the new strategy has been selected, the fuzzy logic controller 22 may repeat the whole evaluation one or more times so that the most appropriate engine strategy is ultimately selected, resulting in measured sensor signals which move closer and closer toward nominal values.

The previously described function of the inference engine 28 and the defuzzification unit 30 is preferably accomplished by a programmed microprocessor, such as a MC68332 made by Motorola, Inc., working in conjunction with the information received from the quantizer 20 and the knowledge base 26. The way in which such a microprocessor may be programmed will be explained with reference to the flow chart shown in FIGS. 8A and 8B. However, some preliminary comments will first be made concerning how sensor signals are preferably evaluated. For this purpose, reference is now made to FIG. 5.

FIG. 5 illustrates how measured ignition timing can vary. Ignition timing is plotted on the horizontal axis, and ignition timing error is plotted on the vertical axis. Point 56 on the horizontal axis represents proper ignition timing which has been achieved for the most recent blend of fuel. With that blend of fuel, there is no error in ignition timing.

When the engine is turned on, it initially uses the previously selected ignition timing (point 56). For a short period of time, the measured ignition timing will be very close to the point 56 because old fuel is still being used. If a new and different fuel blend has been added, it will gradually become dominant, and the ignition timing will deviate ($\Delta t$) from the point 56. This results in an error signal of value E1, for example, being generated following engine start up. If the value of E1, and similar error signals developed by evaluating the outputs of other sensors, indicate that at least a minimum or threshold deviation from nominal has occurred, then the fuzzy logic controller will begin the process of selecting a new engine strategy map.

Figure 8B:
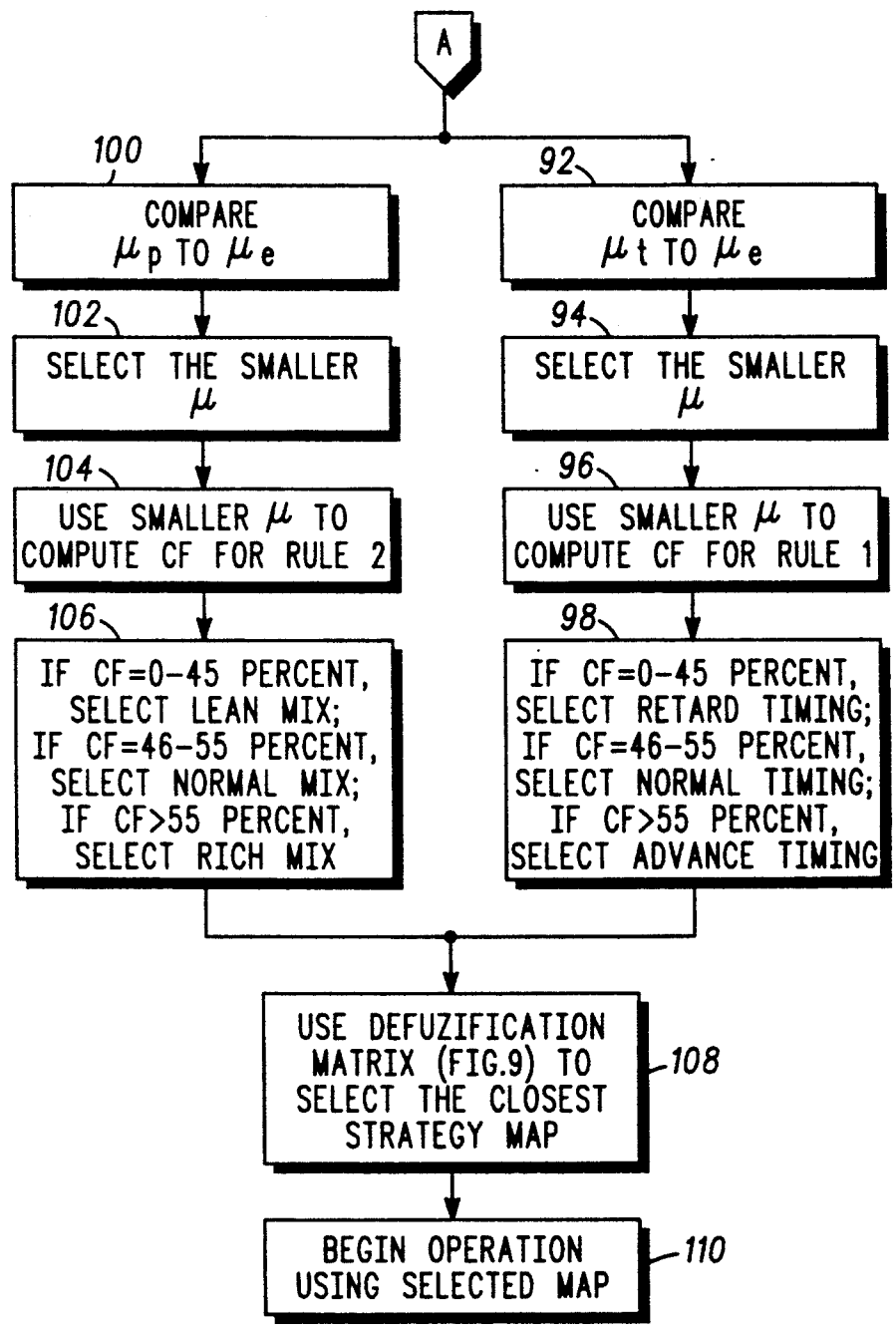
FIGS. 8A and 8B constitute a flow chart showing a preferred method for selecting an operating engine strategy for the engine's fuel blend, including the use of the performance characteristic sets shown in FIGS. 6 and 7.
Figure 8A:
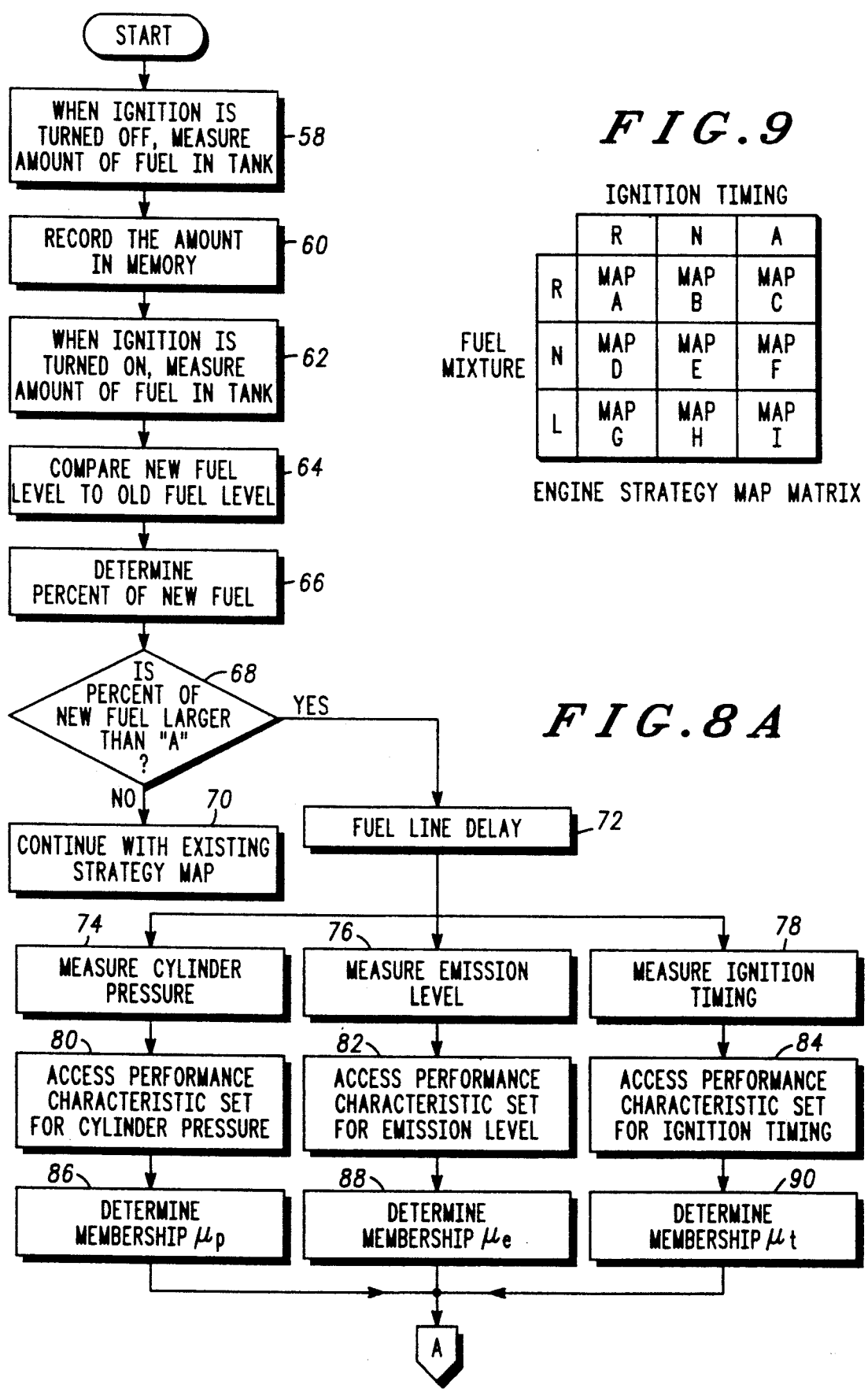

Turning now to FIGS. 8A and 8B, the illustrated flow chart indicates how the microprocessor which implements inference engine 28 and defuzzification unit 30 is preferably programmed to achieve the effects which have been described.

Following "start", instruction 58 causes the fuel volume sensor S1 (FIG. 1) to measure the amount of fuel in the vehicle's fuel tank immediately after the vehicle's ignition is turned off. The measured amount of fuel is recorded per the next instruction 60. When the vehicle's ignition is turned on again, instruction 62 causes the amount of fuel in the tank to be measured again. Then, per instruction 64, the newly measured fuel level is compared to the fuel level measured per instruction 58.

The next instruction 66 determines the percentage of new fuel that has been added to the tank, and instruction 68 asks whether that percentage exceeds a threshold value "A". If the answer is "no" an assumption is made that no fuel, or a negligible volume of fuel, has been added, and the program proceeds to instruction 70 which causes the system to continue using the previously selected engine strategy map.

If the execution of instruction 68 results in a "yes" answer, the program proceeds to instruction 72 which adds a predetermined amount of delay into the program for the purpose of allowing the newly added fuel to mix with old fuel and enter the fuel line before relying on any sensor measurements.

The next step in the program involves measuring and evaluating various engine parameters. Consistent with the description above, only cylinder pressure, emission level, and ignition timing are shown as being measured. It will be understood, however, that additional engine parameters may be sensed and evaluated.

Beginning first with cylinder pressure, instruction 74 causes cylinder pressure to be measured. In parallel with this, instructions 76 and 78 cause emission level and ignition timing to be measured.

After instruction 74 is executed, the next instruction 80 accesses the information that comprises the performance characteristic set for cylinder pressure. The information portrayed by the set 39 in FIG. 7 is accessed from the knowledge base 26 (FIG. 1) per this instruction. Likewise, instruction 82 causes the information comprising the performance characteristic set for emission level to be accessed (set 34 in FIG. 6), and instruction 84 causes the information comprising the performance characteristic set for ignition timing to be accessed (set 36 in FIG. 6).

The next group of instructions 86, 88 and 90 causes the various levels of membership ($\mu$) to be determined for each sensed parameter. Thus, instruction 86 causes the membership level ($\mu_p$) for cylinder pressure to be determined. This corresponds to finding a $\mu$ of 0.25 for a measured pressure $P_1$ as shown in FIG. 7. Likewise, instructions 88 and 90 cause the membership level for emissions ($\mu_e$) and the membership level for ignition timing ($\mu_t$) to be determined.

The remainder of the program involves applying Rules 1 and 2 to compute correction factors, and using the computed correction factors to select an appropriate engine strategy map. The application of Rule 1 is controlled by instructions 92, 94, 96 and 98. The application of Rule 2 is controlled by instructions 100, 102, 104, and 106.

Turning first to instruction 92, the value of $\mu$ for ignition timing ($\mu_t$) is compared to the value of $\mu$ for emission level ($\mu_e$). Then, per instruction 94, the smaller $\mu$ is selected. This corresponds to the use of the AND function previously described.

The next instruction 96 causes the correction factor (CF) to be computed for Rule 1 using the selected smaller $\mu$. In the example of FIG. 6, this corresponds to computing the 30% correction factor using the $\mu$ of 0.25.

Turning now to instruction 100, the value of $\mu$ for cylinder pressure ($\mu_p$) is compared to the value of $\mu$ for emission level ($\mu_e$). Then, per instruction 102, the smaller $\mu$ is selected. Then instruction 104 causes the correction factor (CF) to be computed for Rule 2, using the selected smaller $\mu$. In the example of FIG. 7, this corresponds to computing the 23% correction factor using the $\mu$ of 0.25.

At this point, an alternate method of using the computed correction factors to select an engine strategy map will be used. It will be recalled that after computing the correction factors depicted in FIGS. 6 and 7, a map selection number N1 was computed by using a weighted average technique. The number N1 was then associated with a particular engine strategy map. A somewhat different technique for using the correction factors to select an engine strategy map may also be used, as will now be described.

Turning now to instruction 98, the correction factor computed per instruction 96 is assigned to one of three ranges, each range corresponding to a different correction to be applied to ignition timing. Specifically, a correction factor in the range of 0 to 45% selects a "retard" of ignition timing; a correction factor in the range of 46–55% selects "normal" ignition timing; and a correction factor greater than 55% selects "advance" ignition timing. Thus, the net result of executing instructions 92-98 is to select an ignition timing corresponding to one of three states: "retard", "normal" and "advance". The way in which these results are used is discussed later.

Turning now to instruction 106, the correction factor computed per instruction 104 is also assigned to one of three ranges, each range corresponding to a different correction to be applied to the fuel mixture (i.e., the fuel-to-air ratio). Specifically, a correction factor in the range of 0 to 45% selects a "lean" fuel mixture; a correction factor in the range of 46% to 55% selects a "normal" fuel mixture; and a correction factor that exceeds 55% selects a "rich" fuel mixture.

Figure 9:
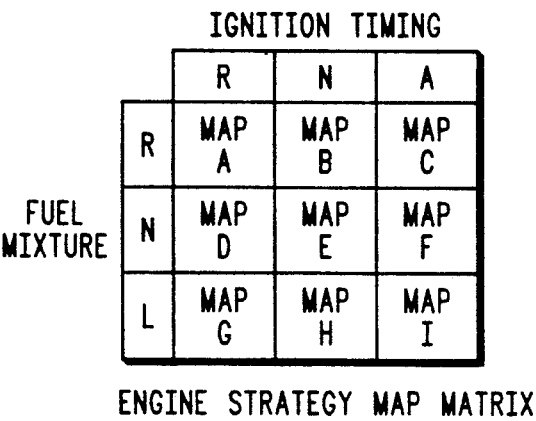
FIG. 9 is an exemplary matrix of engine strategy maps, one of which is selected for use under the control of the flow chart shown in FIGS. 8A and 8B.

The results obtained by the execution of instructions 98 and 106 are now used by instruction 108 to "defuzzify" the results; i.e., to select a specific engine strategy map using the matrix shown in FIG. 9 (to be discussed shortly). Having made that selection, the program proceeds to instruction 110 which causes the selected map to be used.

Referring now to FIG. 9, there is shown a matrix of nine engine strategy maps, identified as Map A through Map I. The three ignition timing states that are selectable per instruction 98 are labelled as R (retard), N (normal) and A (advance), each state being associated with a column of three maps. The three fuel mixture states that are selectable per instruction 106 are labelled as R (rich), N (normal) and L (lean), each such state being associated with one of the illustrated rows of maps. With this arrangement, that map that is selected per instruction 108 is the map that lies at the intersection of the selected state for ignition timing and the selected state for fuel mixture. For example, if the ignition timing state of "advance" (A) is selected and the fuel mixture state of "lean" (L) is selected, instruction 108 would pick Map I for controlling engine strategy. The engine strategy defined by Map I would then be implemented. Assuming that Map I results in an engine strategy that is consistent with the blend of fuel being supplied to the engine, the values of the sensed engine parameters would then move toward nominal, confirming that normal engine performance has been achieved. If the sensed engine parameters do not completely achieve nominal status, the whole map selection process shown in FIGS. 8A and 8B may be repeated until nominal conditions are reached.

If the sensor output signals do not reach their nominal values even after the map selection process has been repeated a number of times (e.g., three or four times), it may be assumed that a fault condition exists. This fault condition may occur due to fuel contamination or to a defect associated with the engine. In either case, the program shown in FIGS. 8A and 8B may include an instruction which alerts the driver to the fault condition so that remedial action may be taken.

It will be appreciated that the present method of optimizing engine performance is relatively low cost, but effective; and because the method preferably recalculates correction factors, etc. only after sensing that at least some new fuel has been received, any slow down due to such recalculation occurs only relatively infrequently. In between refills of fuel, the previously selected engine strategy map continues to be used so long as the engine's sensed parameters remain at or near nominal values.

Although the invention has been described in terms of a preferred embodiment, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. In an automotive system having an engine and a plurality of sensors which develop sensor signals representing various measured engine parameters, a method of optimizing engine performance for different blends of fuel, comprising:
   (1) storing a plurality of engine strategy maps, each such map containing desired engine performance characteristics for a specific blend of fuel;
   (2) storing information indicative of a performance characteristic set for each of a plurality of selected senor signals;
   (3) sensing the values of the selected sensor signals;
   (4) determining the degree of membership of each sensed sensor signal in its performance characteristic set, each such determination resulting in a membership value;
   (5) logically combining the membership values so as to determine a correction factor; and
   (6) selecting an engine strategy map based on the determined correction factor.

2. A method as set forth in claim 1 wherein the automotive system includes a fuel tank, and further including sensing the level of fuel in said fuel tank, and wherein a previously selected engine strategy map is used except when the sensed fuel level indicates that fuel has been added to the fuel tank.

3. A method as set forth in claim 1, wherein a previously selected engine strategy map is used except when the values of selected sensor signals indicate at least a predetermined deviation from nominal.

4. In a automotive system having an engine, a fuel tank, and plurality of sensors which develop sensor signals representing various measured engine parameters, a method of optimizing engine performance for different lends of fuel, comprising:
   (1) storing a plurality of engine strategy maps, each such map containing desired engine performance characteristic for a specific blend of fuel;
   (2) storing information indicative of a performance characteristic set for each of a plurality of selected senor signals;
   (3) sensing the level of fuel in the fuel tank;
   (4) sensing the values of the selected sensor signals, and, when the sensed level of fuel indicates that fuel has ben added to the tank, and when the values of the selected sensor signals indicate at least a minimum deviation from nominal, preceeding to step (5);
   (5) using fuzzy logic to select an engine strategy map which can move the values of the selected sensor signals toward desired values.

5. In an automotive system having an engine, a fuel tank, and plurality of sensors which develop sensor signals representing various measured engine parameters, a method of optimizing engine performance for different bends of fuel, comprising:
   (1) storing a plurality of engine strategy maps;
   (2) storing information indicative of a performance characteristic set for each of a plurality of selected sensor signals;
   (3) sensing the level of fuel in the fuel tank;
   (4) sensing the values of the selected sensor signals, and, when the sensed level of fuel indicates that fuel has ben added to the tank, and when the values of the selected sensor signals indicate at least a minimum deviation from nominal, proceeding to step (5);
   (5) determining the degree of membership of each sensed sensor signal in its performance characteristic set, each such determination resulting in a membership value;
   (6) logically combining the membership values so as to determine a correction factor; and
   (7) selecting an engine strategy map based on the determined correction factor.

* * * * *